(No Model.)

H. W. LIBBEY.
DYNAMO ELECTRIC MACHINE.

No. 567,719. Patented Sept. 15, 1896.

Witnesses.
Winifred S. Kerwin
Edward C. Brown

Inventor.
Hosea W. Libbey
by Edwin Brown
attorney

UNITED STATES PATENT OFFICE.

HOSEA W. LIBBEY, OF BOSTON, MASSACHUSETTS.

DYNAMO-ELECTRIC MACHINE.

SPECIFICATION forming part of Letters Patent No. 567,719, dated September 15, 1896.

Application filed September 16, 1895. Serial No. 562,603. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Dynamo-Electric Machines, of which the following, taken in connection with the accompanying drawings, is a specification.

My invention relates to dynamo-electric machines for generating electricity sufficient for an incandescent lamp, and is particularly applicable for generating electricity for headlights for bicycles, or any machine where a wheel is in motion.

The invention consists of two permanent or field magnets in contact with the brush of a commutator and two or more armatures, each composed of a horseshoe-magnet carrying two spools, said armatures being mounted upon a plate secured to a vertical shaft driven through suitable gearing by frictional contact with a bicycle or other wheel, said armatures being each connected to a commutator, as hereinafter fully described, and pointed out in the claim.

Figure 1:
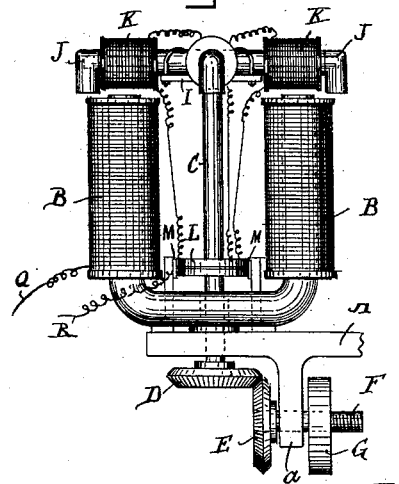
Figure 2:
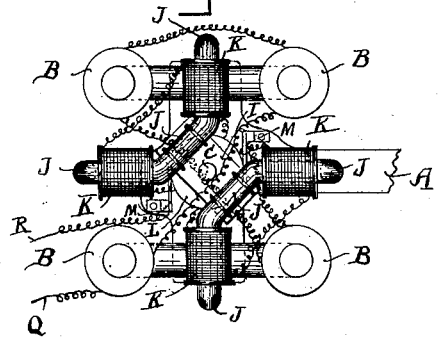
Figure 3:
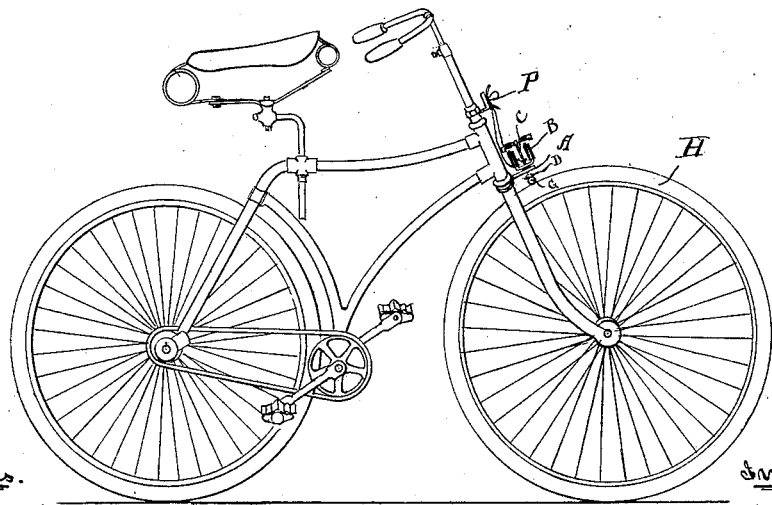

Referring to the accompanying drawings, Figure 1 represents a side view of a dynamo-electric machine embodying my invention. Fig. 2 is a plan or top view of same. Fig. 3 represents a dynamo-electric machine constructed according to my invention and applied to a bicycle to produce electricity for supplying an incandescent lamp or headlight.

A represents a portion of a frame to which are secured two field-magnets B B.

C represents a vertical shaft, upon the lower end of which is fitted a bevel-wheel D, in contact with a bevel-wheel E, carried by a short shaft F, supported by a depending arm *a* of the frame. The outer end of this shaft F is screw-threaded, and mounted thereon is a small friction-wheel G, which when in contact with a driving-wheel, such as a bicycle-wheel H, is caused to rotate, but when it is not desired to have said wheel G rotate it can be turned back out of contact with said wheel H.

Upon the upper end of the shaft C is secured a plate I, to which are secured armatures, each consisting of a horseshoe-magnet J and two spools K K. In the drawings I have only shown two of these armatures, but in practice four would be employed, so that the distance between them and the poles of the field-magnets B would not be so great. The spools K of the armatures are connected to a commutator L, secured onto the upright shaft C and rotating in the central space between the field-magnets B.

Brushes M, carried by standards secured to the frame A, are in contact with the commutator L, one of which is in connection with the field-magnets B and the other with an incandescent lamp P, the wire Q from the field-magnets to the lamp being the positive and the wire R from the lamp to the brush of the commutator being the negative, the connection between the field-magnets B being arranged, as shown, so that they act in unison or as one magnet.

What I claim is—

A dynamo-machine having a frame A adapted to be fastened to a bicycle, an arm *a* depending from said frame, a rotatable shaft F mounted in said arm and having a threaded end with friction-wheel G thereon, bevel-wheel E secured to the other end of said shaft, a vertical shaft C with wheel D on its lower end meshing in said wheel E, field-magnets secured to said frame A, a commutator L mounted on said shaft C, brushes M on said frame engaging said commutator L, a circular plate I secured to the upper end of shaft C, armatures secured thereto and provided with spools K electrically connected with said commutator and a lamp connected with one of the said field-magnets and a brush of the commutator, said parts being combined substantially as described.

In testimony whereof I have signed my name to this specification, in the presence of two subscribing witnesses, on this 30th day of August, A. D. 1895.

HOSEA W. LIBBEY.

Witnesses:
CHAS. STEERE,
EDWIN PLANTA.